Figure 2:
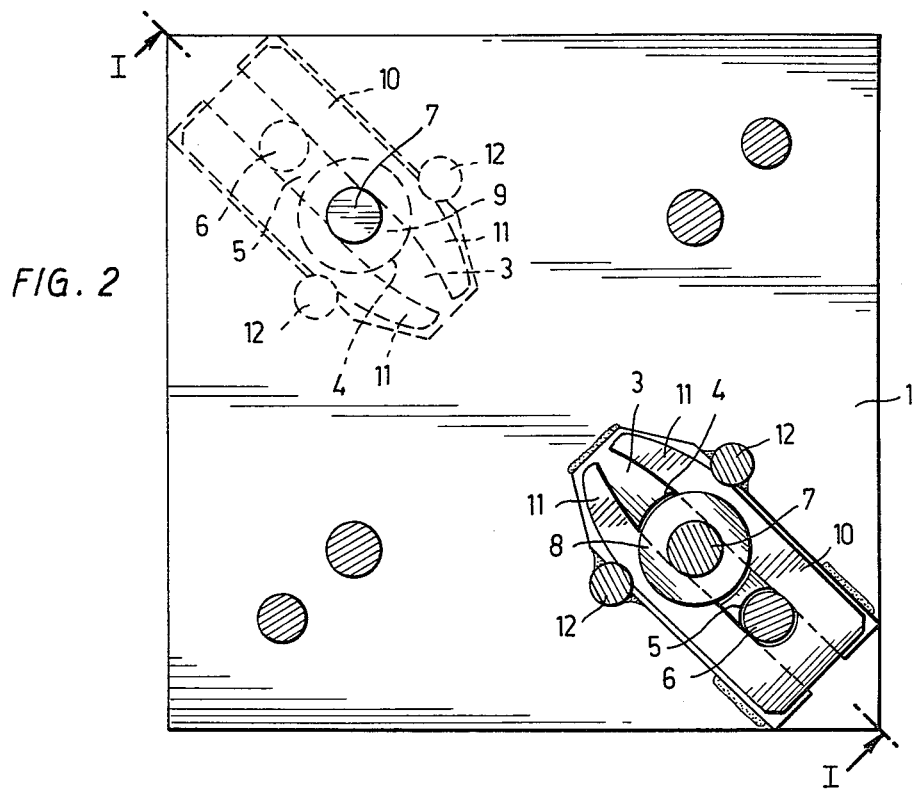

United States Patent [19]

Vesa et al.

[11] 4,362,417
[45] Dec. 7, 1982

[54] EXTENSION JOINT FOR CONCRETE PILES

[76] Inventors: Markku Vesa, Kytöniityntie 49 E, 00670 Helsinki 67; Matti Kaimo, Hemgården, 08700 Virkkala, both of Finland

[21] Appl. No.: 142,654

[22] Filed: Apr. 22, 1980

[30] Foreign Application Priority Data

May 11, 1979 [FI] Finland ................................ 791517

[51] Int. Cl.³ .............................................. E04B 1/48
[52] U.S. Cl. .................................. 403/317; 403/374; 405/251
[58] Field of Search ............... 403/374, 379, 338, 324, 403/409, 252, 316, 317; 405/251, 252

[56] References Cited

U.S. PATENT DOCUMENTS

| 2,013,962 | 9/1935 | Hutchens | 403/379 |
| 3,626,652 | 12/1971 | Hanley | |
| 3,858,993 | 1/1975 | Lovisa et al. | 403/409 X |
| 3,884,589 | 5/1975 | Liedholm | 403/374 X |

FOREIGN PATENT DOCUMENTS

| 51980 | 3/1970 | Finland . |
| 761559 | 6/1976 | Finland . |
| 178840 | 4/1962 | Sweden . |
| 302929 | 8/1968 | Sweden . |
| 224114 | 12/1968 | Sweden . |

Primary Examiner—Andrew V. Kundrat

[57] ABSTRACT

The invention relates to an extension joint for concrete piles of the type in which at least one pin in a first pile penetrates into a recess in a second pile. The end of the pin is provided with a shoulder and is locked in the second pile by means of a wedge having shanks each engaging one side of the pin. The wedge is locked in its driven-in position while being driven in by the bending of the shanks towards each other after they have passed the pin.

8 Claims, 4 Drawing Figures

U.S. Patent    Dec. 7, 1982    4,362,417

EXTENSION JOINT FOR CONCRETE PILES

This invention relates to an extension joint for concrete piles in which the joint ends of the piles are provided with a bottom plate to which are fastened jointing means comprising a pin projecting from the bottom plate of a first pile, an opening in the bottom plate of a second pile, and a stop face which is located around the opening on the inside of the bottom plate and through which said pin can extend, and a wedge is transverse to the pin and provided with shanks each engaging the pin on one side and which can be wedged in between a shoulder at the end of the pin and the stop face for locking the pin of the first pile to the second pile with prestressing.

Such an extension joint is known from Swedish Printed Specification No. 302,929 in which a circular pin is provided with two grooves for the shanks of a wedge. The pin extends only a short distance inside the bottom plate, and a steel anchor parallel to the pile is welded to its bottom. The joint has four pins and one wedge for each pair of pins. The wedge is secured in the locking position by means of an ear which is located adjacent to the insertion opening for the wedge and which is folded over the opening.

The disadvantage in such a joint is the somewhat complicated and, hence, expensive construction and the unreliable locking of the wedge in place. The locking ear on the outer surface of the pile can easily bend when driving the pile into the ground whereby the wedge can be displaced outwards. This can result in a loss of the prestressing or tightness of the joint and in play between the piles which may cause breakages in the piles or in the extension joints.

The object of the present invention is to provide an extension joint for concrete piles which is simpler in construction than the joint described above and in which no wedge locking problem are present. In addition, the extension joint as such must be applicable to the manufacture of both prestressed and unstressed piles.

The invention is characterized in that guide means are fastened to the stop face, in the path of the shanks of the wedge when driving these in place, so that the shanks are bent towards each other after having passed the holding pin, thus locking the wedge in the locking position. Under the action of the guide means, the shanks of the wedge are, while being driven in, bent towards each other whereby, in the same operation, the wedge is both installed in place and locked in the locking position. It is obvious that such an internal locking of the pile is more reliable than a locking accomplished by means of a locking ear on the outer surface of the pile.

According to one preferred embodiment of the invention, the guide means comprise steel anchor rods which are circular in cross-section and fastened to two opposite outer sides of a locking plate secured to the inside of the bottom plate. Thus, the guide means for the shanks of the wedge have dual function because they, on one hand, function as anchoring rods and, on the other hand, as guide means so that the wedge is locked in place without any special locking means.

According to a second embodiment of the invention, the outer sides of the wedge are provided with recesses in which the guide means are received when the wedge is located in the bottom position. Such recesses in a simple way ensure the locking of the wedge in its position.

According to the invention, it is also preferred that the pin is made of a steel anchoring rod extending through the bottom plate because, in this way, the use of a separate pin is avoided.

Figure 1:
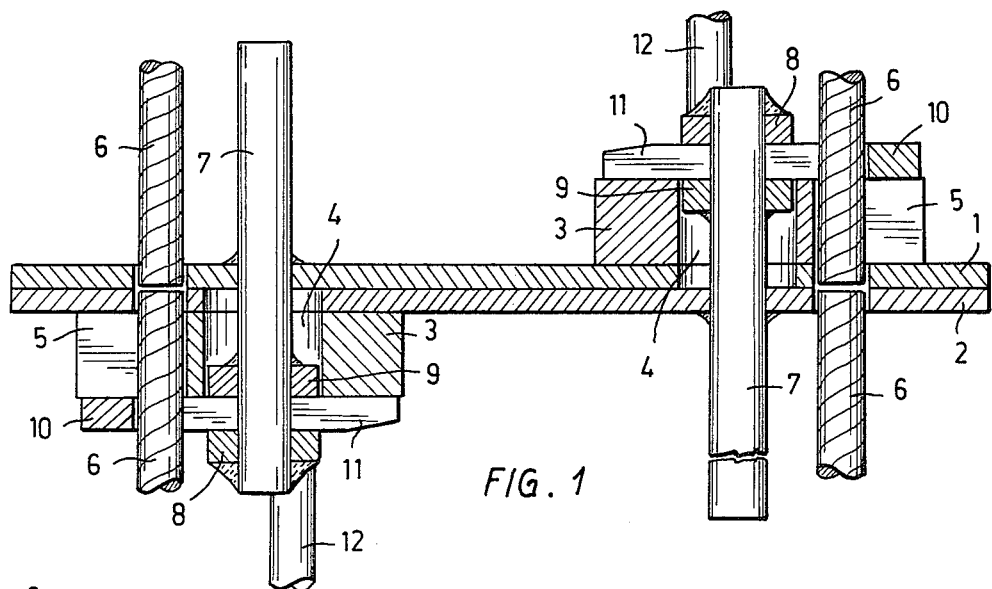
Figure 3:
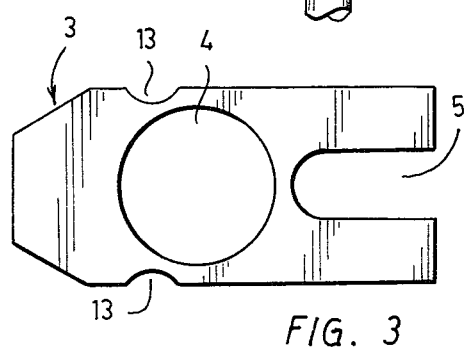
Figure 4:
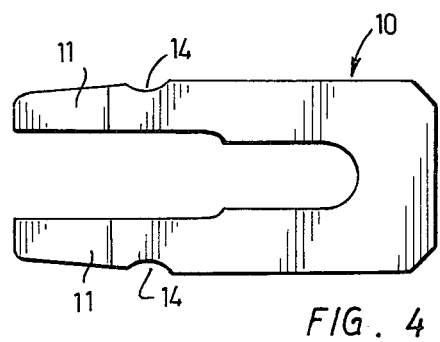

The invention will now be described in more detail with reference to the accompanying drawing in which FIG. 1 illustrates an extension joint according to the invention in vertical section along the line 1—1 in FIG. 2, FIG. 2 is plane view of the extension joint, FIG. 3 is a plane view of a locking plate on a larger scale, and FIG. 4 is a plane view of a wedge, similarly on a larger scale.

The extension joint for concrete piles shown in FIGS. 1 and 2 is provided with a bottom plate which is located in the end of the pile and which forms the end surface of the pile. The bottom plate of the upper pile is indicated by reference numeral 1 and that of the lower one by reference numeral 2. Each bottom plate is provided with an opening around which, on the inside of the bottom plate, is secured a locking plate 3 more clearly shown in FIG. 3. The locking plate comprises an approximately parallelepipedon-shaped body whose centre is provided with a through-hole 4 which is circular in cross-section and has the same diameter as the above-mentioned opening in the bottom plate while being positioned in register with said opening. The outward end of the locking plate is, moreover, provided with a U-shaped recess 5 for a prestressing wire 6 extending through the bottom plate. The top surfaces of the locking plate form stop faces. The extension joint further includes a wedge 10 (see FIG. 4) which is essentially U-shaped and in which the distance between the shanks 11 corresponds, partly, to the diameter of the anchoring rod 7 and, partly, to the diameter of the prestressing wire 6.

To the bottom plate is also secured by welding. A steel anchoring rod 7 which is circular in cross-section extends through the bottom plate while forming a pin projecting therefrom, the length of said pin exceeding the thickness of the locking plate 3. To the free end of the anchoring rod 7 is fastened by welding a flange 8 having a somewhat smaller diameter than that of the hole 4 in the locking plate so that the flange can be inserted through the hole. The flange 8 is positioned so that its lower surface forms a shoulder spaced from the stop faces of the bottom plate. With the bottom plates abutting against each other, the distance between the shoulder of the flange and the stop faces in the bottom plate is somewhat smaller than the thickness of the wedge whereby a prestressing is produced between the piles during the wedging operation. However, to permit an easy positioning of the wedge in place, the thickness of the front parts of the shanks 11 of the wedge 10 diminishes somewhat toward the end. To the anchoring rod 7, at some distance from the flange 8, a second flange 9 of the same diameter as the flange 8 is preferably fastened. The flange 9 prevents lateral displacement of the ends of the pile before wedging. Similarly, it prevents any bending due to wedging force of the anchoring rod 7 functioning as a pin.

Somewhat forwards from the centre of the hole 4 in the direction of movement of the wedge 10, the longitudinal sides of the locking plate 3 are provided with two curved recesses 13 for steel anchoring rods 12 which are by welding secured to the locking plate and possibly to the bottom plate. The smallest distance between these anchoring rods is a little shorter than the distance between the outer edges of the shanks 11 of the wedge.

The outsides of the shanks 11 of the wedge are provided with two curved recesses 14 whose curvature corresponds to the diameter of the anchoring rods 12 and which are located in the corresponding place in the wedge as the recesses 13 in the locking plate 3 when the wedge is in locking position.

The extension joint for concrete piles according to the invention is mounted in the following manner.

When a concrete pile (not shown) whose bottom plate is indicated by reference numeral 2 has been driven deep enough into the ground, a second concrete pile is placed on top of it whose bottom plate is indicated by reference numeral 1. During this operation, the anchoring rod 7 secured to the bottom plate 1 together with its flange penetrates into the hole 4 in the locking plate 3 fastened to the bottom plate and partly through said hole. In a corresponding manner, the anchoring rod secured to the bottom plate 2 penetrates into the hole 4 in the locking plate 3 fastened to the bottom plate 1 and partly through said hole.

When the bottom plates abut against each other, the wedge 10 is driven in between the locking plate 3 and the flange 8 from the corner of the pole so that its shanks engage different sides of the prestressing wire 6 and the anchoring rods 7. While the wedge is driven in, the outer surfaces of its shanks hit the anchoring rods 12 whereby the shanks 11 are bent towards each other while locking the wedge in place because the distance between the bent shanks is smaller than the diameter of the anchoring steel. The wedge has reached its end position when its impact surface is located in the same plane as the outer end of the locking plate whereby also the recesses 14 in the sides of the wedge reach the anchoring rods 12 and ensure the locking.

Differing from what is described above, the locking plate 3 can be replaced by a thick bottom plate, and as guide means for the shanks of the wedge can be used also other guides than anchoring rods.

In addition, it should be noted that the anchoring rod 7 functioning as a pin need not extend through the bottom plate, but a separate pin can be welded to the opposite side of the bottom plate or to the end of the anchoring steel. To the edge of the bottom plate can also be secured a flange extending a short distance along the outer surface of the concrete pile. As appears from the Figures, the extension pieces according to the invention are symmetrical so that the piles to be extended are interchangeable.

What we claim is:

1. A joint assembly for connecting two piles, the bottom plates of which are each correspondingly formed with a projecting pin and a hole spaced therefrom whereby the projecting pin of one pile may be inserted into the hole of a second pile, comprising a flange secured to the end of said pin having an outer dimension less than the dimension of said hole, and a locking plate secured to said pile over the bottom plate and having an opening in registry with said hole through which said flange passes, and a U-shaped wedge insertable about said pin, between the flange and the upper surface of the locking plate for placing said flange and locking plate under opposing stress thereby securing said piles together.

2. The joint assembly according to claim 1 including a block secured to said pin inwardly of said flange to prevent lateral movement of said pin within the hole.

3. The joint assembly according to claim 1, including guide means secured to each said pile in association with said hole and locking plate for guiding the shanks of said U-shaped wedge about said pin and for bending said shanks inwardly toward each other on passing said pin.

4. The joint assembly according to claim 3 wherein said guide means comprises a pair of rods anchored within said pile, said rods being respectively located on opposite sides of said locking plate.

5. The joint assembly according to claim 4 wherein the locking plates are provided with recesses for said rods.

6. The joint assembly according to claim 3, 4 or 5 wherein the outer edges of the shanks of said U-shaped wedge are formed with recesses receiving said guide means and securing said wedge in position.

7. The joint assembly according to claim 1, 3, 4 or 5 wherein the upper surface of said locking plate is planar and the wedge is formed with a planar bottom surface adapted to slide over the upper surface of said locking plate and an inclined upper surface adapted to engage said flange.

8. The joint assembly according to claim 1, 3, 4 or 5, wherein said locking plate and pile are provided with a second opening and hole in registry for insertion of a tensioning wire, and said U-shaped wedges provided with an elongated opening between its shanks for passage about said wire.

* * * * *